United States Patent [19]
Brady et al.

[11] 3,929,708
[45] Dec. 30, 1975

[54] ARYLENE SULFIDE POLYMERS COMPRISING SILICONE FLUIDS

[75] Inventors: Donnie G. Brady; Fay W. Bailey, both of Bartlesville, Okla.

[73] Assignee: Phillips Petroleum Company, Bartlesville, Okla.

[22] Filed: Aug. 15, 1974

[21] Appl. No.: 497,620

[52] U.S. Cl............. 260/29.1 SB; 260/79; 264/211; 264/300
[51] Int. Cl.².... C08J 5/00; C08K 5/54; C08L 81/04
[58] Field of Search........ 260/29.1 SB, 79; 264/211, 264/300

[56] References Cited
UNITED STATES PATENTS

| | | |
|---|---|---|
| 2,471,850 | 5/1949 | Wilcock ................... 260/29.1 SB |
| 3,487,954 | 12/1969 | Oates et al..................... 260/79.1 |
| 3,684,756 | 8/1972 | Brooks ...................... 260/29.1 SB |
| 3,725,362 | 4/1973 | Walker .................................. 260/79 |
| 3,737,411 | 6/1973 | Scoggins ............................. 260/79 |
| 3,811,903 | 5/1974 | Daskivich ......................... 264/211 |

*Primary Examiner*—Allan Lieberman

[57] ABSTRACT

The processing characteristics such as molding and extrudability of poly(arylene sulfide) resins are improved by incorporating therein a small amount of a silicone fluid. Resin properties such as wettability, coefficient of friction, and color are also improved.

8 Claims, No Drawings

ARYLENE SULFIDE POLYMERS COMPRISING SILICONE FLUIDS

This invention relates to the improvement of processing characteristics of poly(arylene sulfide) resins.

Poly(arylene sulfide) resins have become commercially important resins and are finding increasing utility because of their outstanding durability, toughness, inertness, and versatility. The present invention still further extends the value of these resins by further improvements. The improvements are in the area of processing characteristics and properties of the resin.

Accordingly, an object of this invention is to improve the processing characteristics of poly(arylene sulfide) resins.

A further object of this invention is to provide poly(arylene sulfide) resins having improved molding and extruding characteristics.

Other objects and aspects, as well as the several advantages of the invention, will be apparent to those skilled in the art upon reading the specification and the appended claims.

In accordance with the invention, it has been found that the addition of a small amount of a silicone fluid to poly(arylene sulfide) resins results in a product having improved processing characteristics.

In one embodiment of this invention the addition of from about 0.05 to about 5 weight percent, based on the composition, of a silicone fluid to a poly(arylene sulfide) resin results in a composition having improved molding and extruding characteriestics.

In another embodiment of this invention, the molding and extruding characteristics of a poly(arylene sulfide) resin are improved by incorporating therein from about 0.05 to about 5 weight percent of a silicone fluid, based on the combined weight of resin and fluid.

The present invention is useful with poly(arylene sulfide) resins generally, regardless of the method of preparation. Preferably, however, the poly(arylene sulfide) resins are prepared by use of polyhalo compounds, alkali metal sulfides, and polar organic compounds as described in U.S. Pat. No. 3,354,129 issued Nov. 21, 1967 to Edmonds and Hill.

According to the Edmonds et al patent, poly(arylene sulfide) resins can be prepared in high yields by reacting (a) at least one polyhalo-substituted cyclic compound containing unsaturation between adjacent ring atoms wherein the halogen atoms are attached to ring carbon atoms with (b) an alkali metal sulfide in the presence of a polar organic compound at an elevated temperature. The polymers produced by the process of said Edmonds et al patent are ordinarily particulate materials and the properties of these materials will vary considerably depending upon the chosen reactants. Some are high-melting thermoplastic materials having extra high temperature stability while others can be much lower in molecular weight, including liquids and grease-like materials. Melting points and softening points of these materials can range all the way from liquids at 25°C to polymers softening about 400°C, and the latter materials are ordinarily very difficult to process in conventional molding and extruding equipment.

Generally, the poly(arylene sulfide) resins useful in this invention can be either linear or crosslinked, with a melting point in the approximate range of 400° to 800°F, preferably within the approximate range of 400° to 600°F. These polymers have a melt flow of about 0.1 to about 3,000, preferably from about 0.5 to about 2,000, as determined according to ASTM D 1238-70, modified to a temperature of 600°F using a 5-kg weight, the value being expressed as g/10 min.

The presently preferred arylene sulfide polymer is a poly(phenylene sulfide), e.g., partially cured poly(p-phenylene sulfide) produced by heating linear poly(p-phenylene sulfide) until the melt flow has been reduced to the desired level.

The silicone fluids suitable for use in this invention are those polysiloxanes having the repeating units

wherein each R is a monovalent hydrocarbon radical having up to 6 carbon atoms individually selected from the group consisting of alkyl, cycloalkyl and aryl.

Examples of suitable polysiloxanes include dimethyl polysiloxane, diethyl polysiloxane, dibutyl polysiloxane, dihexyl polysiloxane, dicyclohexyl polysiloxane, diphenyl polysiloxane, methyl ethyl polysiloxane, phenyl methyl polysiloxane, cyclopentyl propyl polysiloxane, and the like, and mixtures thereof. Presently preferred are dimethyl polysiloxane and phenyl methyl polysiloxane. The silicone fluid selected should be substantially thermally stable under the molding or extrusion conditions to which the mixture of arylene sulfide polymer and silicone fluid is to be subjected. Preferably, the silicone fluid has thermal stability at 500°F. Generally the silicone fluid will have a molecular weight within the range of about 500 to about 3000, preferably about 1000 to about 2500.

The amount of silicone fluid in the mixture comprising arylene sulfide polymer and silicone fluid can vary over a wide range but generally will be within the range of about 0.05 to about 5, preferably about 0.1 to about 4.5, weight percent based on the total weight of arylene sulfide polymer plus silicone fluid. Typical mechanical properties such as tensile strength, elongation, and Izod impact strength of the arylene sulfide polymer are not adversely affected by the presence of the silicone fluid in these amounts.

If desired, fillers or additives such as pigments, stabilizers, softeners, extenders, or other polymers can be present in the mixture comprising the arylene sulfide polymer and silicone fluid. For example, there can be present substances such as graphite, carbon black, titanium dioxide, glass fibers, carbon fibers, metal powders, magnesia, silica, asbestos, wollastonite, clays, wood flour, cotton floc, alpha cellulose, mica, and the like.

Although the silicone fluid can be mixed with the arylene sulfide polymer and fillers or additives, if present, in any manner, it is presently preferred that the polymer be in the particulate form and that there be present, to aid in the mixing, a volatilizable diluent in which the silicone fluid is soluble and which does not react with any of the components in the mixture. The volatilizable diluent subsequently can be removed readily, e.g., by heating under reduced pressure. Examples of some suitable diluents include hydrocarbons such as benzene, toluene, hexane, and cyclohexane; ethers such as diethyl ether, dibutyl ether, dioxane, and tetrahydrofuran; ketones such as acetone, methyl ethyl ketone, and cyclohexanone; esters such as ethyl acetate and butyl acetate; halogenated hydrocarbons such as chloroform, carbon tetrachloride, methylene chloride, ethylene dichloride, and chlorobenzene; and the like.

Advantages obtained from the blends of the invention include greater ease in extrusion of the poly(arylene sulfide) resin, particularly where very tough, high molecular weight polymers are processed in reciprocating screw injection molding machines. Also, greater ease in filling a mold and the elimination of the need for release agents, normally applied to the molds will be realized according to the invention. Furthermore, the addition of the silicone fluid results in a reduction of the surface coefficient of friction and decreased wettability by water, and imparts lubricity which thereby eliminates the need for additional lubricants such as molybdenum disulfide and provides ready release of finished parts made from poly(arylene sulfide) resins from the molds. Still another advantage is the unexpected lighter color of the molding or extrudate.

The products of the invention have utility for extrusion of sheets, wire coverings, the molding of shaped articles, and the like. Other uses include ablative materials in nose cones of spaceships, valve seats, heat resistant metal coatings, insulators, and the like.

The following example illustrates the invention:

EXAMPLE I

Four mixtures of partially cured poly(p-phenylene sulfide), herein designated as PPS, and silicone fluid were prepared. The PPS, which had a melting point of about 545°F, was produced by heating poly(p-phenylene sulfide) in air at approximately 475°F until the melt flow (ASTM D 1238-70, modified to a temperature of 600°F using a 5-kg weight, value expressed as g/10 min) of the polymer was reduced to 32.5. The poly(p-phenylene sulfide) employed was prepared by the process of U.S. Pat. No. 3,354,129 from p-dichlorobenzene, sodium sulfide, and N-methyl-2-pyrrolidone. The silicone fluids used were dimethyl polysiloxane having an average molecular weight of 1600 and phenyl methyl polysiloxane having an average molecular weight of 1735.

The four mixtures of PPS and silicone fluid were prepared as follows:

1. Mixture A

A solution of 50 g of dimethyl polysiloxane in 600 ml of benzene was added to 500 g PPS. The mixture was stirred, then the benzene was removed under vacuum. The resulting dry powder was mixed with 1760 g PPS by roll milling. The resulting mixture had the composition: 97.8 weight percent PPS and 2.2 weight percent dimethyl polysiloxane.

2. A mixture (B) of 95.8 weight percent PPS and 4.2 weight percent dimethyl polysiloxane was prepared in like manner except that 100 g of dimethyl polysiloxane, vice 50 g, was used.

3. Mixture C containing 97.8 weight percent PPS and 2.2 weight percent phenyl methyl polysiloxane, was prepared in like manner.

4. Mixture D containing 95.8 weight percent PPS and 4.2 weight percent phenyl methyl polysiloxane was prepared in like manner.

The melt flow of each of the four mixtures was determined, after which each of the mixtures and PPS as control were melt extruded at 600°F and pelletized. The melt flow of each of the five pelletized materials was determined. Spiral flow values for each of the five pelletized materials were determined using a New Britain Model 75B injection molder having a spiral flow mold with a cavity 3/8-inch wide and 1/16-inch thick, the spiral being 51 inches long, marked in ¼-inch increments. These materials were molded using a stock temperature pf 600°F, a mold temperature of 240°F and an injection pressure of 13,000 psi. The data are summarized in Table I below:

Table I

|  | Mixture | | | | Control |
|---|---|---|---|---|---|
|  | A | B | C | D | PPS |
| Melt flow before extruding and pelletizing | 30 | 48 | 33 | 31.5 | 32.5 |
| Melt flow after extruding and pelletizing | 18.7 | 32 | 24 | 34 | 15 |
| Spiral flow, in. | 12.2 | 12.7 | 13 | 12.4 | 11.7 |
| Color of spiral molding | Brown | Brown | Brown | Brown | Black |

As shown in Table I, the spiral flow of Mixtures A, B, C, and D, each containing a polysiloxane in accordance with the invention, was greater than that of the control containing no polysiloxane, thus indicating improved extrudability and moldability of the mixtures due to the presence of the polysiloxanes. Furthermore, whereas the spiral molding from the PPS alone was black, the spiral moldings from mixtures A, B, C, and D, more desirably, were brown.

EXAMPLE II

A mixture of 97.8 weight percent PPS and 2.2 weight percent dimethyl polysiloxane having an average molecular weight of 1600 was prepared by the method used to produce Mixture A in Example I. The mixture, which had a melt flow of 26.6, was extruded at 600°F and pelletized, after the impact bars (½ in. × ¼ in. × 5 in.) were prepared from the pelletized mixture by injection molding using a stock temperature of 600°F, a mold temperature of 150°F, and an injection pressure of 7000 psi. From the impact bars were machined flat test blocks (0.400 in. × 0.250 in. × 0.620 in.) for determination of coefficient of friction, using an Alpha Lubricant Testing Machine, Model LFW-1 (The Alpha Molykote Corporation). For comparative purposes, flat test blocks for determination of coefficient of friction were also machined from impact bars produced from PPS alone, extruded, pelletized, and molded as described above. The results of the coefficient of friction tests are shown in Table II.

Table II

| RPM | Normal Load, Pounds | Dry Coefficient of Friction[a] | |
|---|---|---|---|
|  |  | PPS + Polysiloxane | PPS Alone |
| 0 | 15 | 0.33 | 0.60 |
| 40 | 15 | 0.39 | 0.63 |
| 100 | 15 | 0.33 | 0.67 |
| 190 | 15 | 0.30 | 0.63 |
| 190 | 90 | 0.12 | 0.78 |

[a] Determined on a single test block of each composition, each determination being made after 2 minutes at the specified RPM under the normal load of 15 pounds and after 10 minutes at the specified RPM under the normal load of 90 pounds.

Thus, the presence of the dimethyl polysiloxane resulted in a large reduction in the coefficient of friction.

A mixture of 97.8 weight percent PPS and 2.2 weight percent phenyl methyl polysiloxane having an average molecular weight of 1735 was prepared by the method used to produce Mixture C in Example I. The mixture, which had a melt flow of 33.5, was extruded at 600°F and pelletized. Tensile bars were then prepared from this pelletized mixture, from the pelletized mixture described above in this Example containing dimethyl polysiloxane, and from pelletized PPS alone, the molding conditions being as shown above in this Example. The contact angle of water on each of these tensile bars was then determined on a Contact Angle Goniometer Model A-100, Rame-Hart, Inc., the contact angle being about 83° on the bars molded from each of the pelletized mixtures containing the specified polysiloxane compared to about 74° on the bar molded from the pelletized PPS alone. Thus, the presence of either of the polysiloxanes served to decrease the water wettability of the test bars.

Reasonable variations and modifications, which will be apparent to those skilled in the art, can be made in this invention without departing from the spirit and scope thereof.

What is claimed is:

1. A composition of matter comprising at least one (poly(arylene sulfide) resin having a melt point in the approximate range of 400° to 800°F, and a melt flow in the approximate range of 0.1 to 3,000, and from about 0.05 to about 5 weight percent of a thermally stable silicone fluid, based on the combined weight of said resin and said fluid, wherein said silicone fluid is a polysiloxane having a molecular weight in the approximate range of 500 to 3,000 and having the repeating units

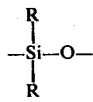

wherein each R is a monovalent hydrocarbon radical having up to 6 carbon atoms individually selected from the group consisting of alkyl, cycloalkyl and aryl.

2. The composition of claim 1 wherein said resin is poly(phenylene sulfide).

3. The composition of claim 1 wherein said silicone fluid is dimethyl polysiloxane.

4. The composition of claim 1 wherein said silicone fluid is phenyl methyl polysiloxane.

5. A method for improving the molding and extruding characteristics of poly(arylene sulfide) resins without substantially altering other physical properties which comprises incorporating therein from about 0.05 to about 5 weight percent of a thermally stable silicone fluid, based on the weight of resin plus the weight of silicone fluid; wherein said resin has a melt point in the approximate range of 400° to 800°F and a melt flow in the approximate range of 0.1 to 3,000; and wherein said silicone fluid is a polysiloxane having a molecular weight in the approximate range of 500 to 3,000 and having the repeating units

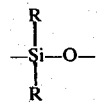

wherein each R is a monovalent hydrocarbon radical having up to 6 carbon atoms individually selected from the group consisting of alkyl, cycloalkyl and aryl.

6. The method of claim 5 wherein said resin is poly(phenylene sulfide).

7. The method of claim 5 wherein said silicone fluid is dimethyl polysiloxane.

8. The method of claim 5 wherein said silicone fluid is phenyl methyl polysiloxane.

* * * * *